(12) United States Patent
Eryuksel et al.

(10) Patent No.: US 12,311,487 B2
(45) Date of Patent: May 27, 2025

(54) LIFE DETECTION SYSTEM FOR MACHINING TOOLS

(71) Applicant: TUSAS- TURK HAVACILIK VE UZAY SANAYII ANONIM SIRKETI, Kahramankazan/Ankara (TR)

(72) Inventors: Ogul Can Eryuksel, Kahramankazan/Ankara (TR); Metin Tabalu, Kahramankazan/Ankara (TR); Ahmet Kuzubasli, Cankaya/Ankara (TR); Fatih Erdinc, Kahramankazan/Ankara (TR); Hakan Aydemir, Kahramankazan/Ankara (TR)

(73) Assignee: TUSAS-TURK HAVACILIK VE UZAY SANAYI ANONIM SIRKETI, Kahramankazan/Ankara (TR)

( * ) Notice: Subject to any disclaimer, the term of this patent is extended or adjusted under 35 U.S.C. 154(b) by 401 days.

(21) Appl. No.: 17/787,553

(22) PCT Filed: Dec. 23, 2020

(86) PCT No.: PCT/TR2020/051363
§ 371 (c)(1),
(2) Date: Jun. 20, 2022

(87) PCT Pub. No.: WO2021/137813
PCT Pub. Date: Jul. 8, 2021

(65) Prior Publication Data
US 2022/0402086 A1 Dec. 22, 2022

(30) Foreign Application Priority Data
Dec. 30, 2019 (TR) .................. 2019/22399

(51) Int. Cl.
*G05B 19/40* (2006.01)
*B23Q 17/24* (2006.01)
*G05B 19/4065* (2006.01)

(52) U.S. Cl.
CPC ....... *B23Q 17/249* (2013.01); *G05B 19/4065* (2013.01); *G05B 2219/33002* (2013.01); *G05B 2219/50206* (2013.01)

(58) Field of Classification Search
None
See application file for complete search history.

(56) References Cited

U.S. PATENT DOCUMENTS

| | | |
|---|---|---|
| 2018/0067471 A1 | 3/2018 | Saitou et al. |
| 2019/0145183 A1 | 5/2019 | Potash |
| 2021/0358110 A1 * | 11/2021 | Bücher ................ G06T 7/0004 |

FOREIGN PATENT DOCUMENTS

| | | | |
|---|---|---|---|
| CN | 101758423 A | * | 6/2010 |
| CN | 108356607 A | | 8/2018 |

(Continued)

OTHER PUBLICATIONS

International Search Report for corresponding PCT application No. PCT/TR2020/051363, mailed Feb. 28, 2021.

(Continued)

*Primary Examiner* — Hien D Khuu
(74) *Attorney, Agent, or Firm* — Notaro, Michalos & Zaccaria P.C.

(57) ABSTRACT

A body and at least one control unit that stores and/or controls data for drilling processes is disclosed. At least one machining tool is located on the body extends outward from the body, and provides part shaping, at least one image capturing device that is controlled by the control unit and connected with the control unit for capturing images is also present.

9 Claims, 1 Drawing Sheet

(56) References Cited

FOREIGN PATENT DOCUMENTS

| | | | | |
|---|---|---|---|---|
| CN | M583566 | U | * | 9/2019 |
| JP | H06-709 | A | * | 1/1994 |
| JP | H11267949 | A | | 10/1999 |
| JP | 2005199379 | A | | 7/2005 |
| JP | 6545555 | B2 | * | 7/2019 |
| KR | 20170100387 | A | * | 9/2017 |
| WO | 2019087213 | A1 | | 5/2019 |

OTHER PUBLICATIONS

Written Opinion of the Preliminary Examining Authority for corresponding PCT application No. PCT/TR2020/051363, mailed Jan. 4, 2022.

Written Opinion of the Preliminary Examining Authority for corresponding PCT application No. PCT/TR2020/051363, mailed Mar. 1, 2022.

International Preliminary Report on Patentability for corresponding PCT application No. PCT/TR2020/051363, mailed May 31, 2022.

\* cited by examiner

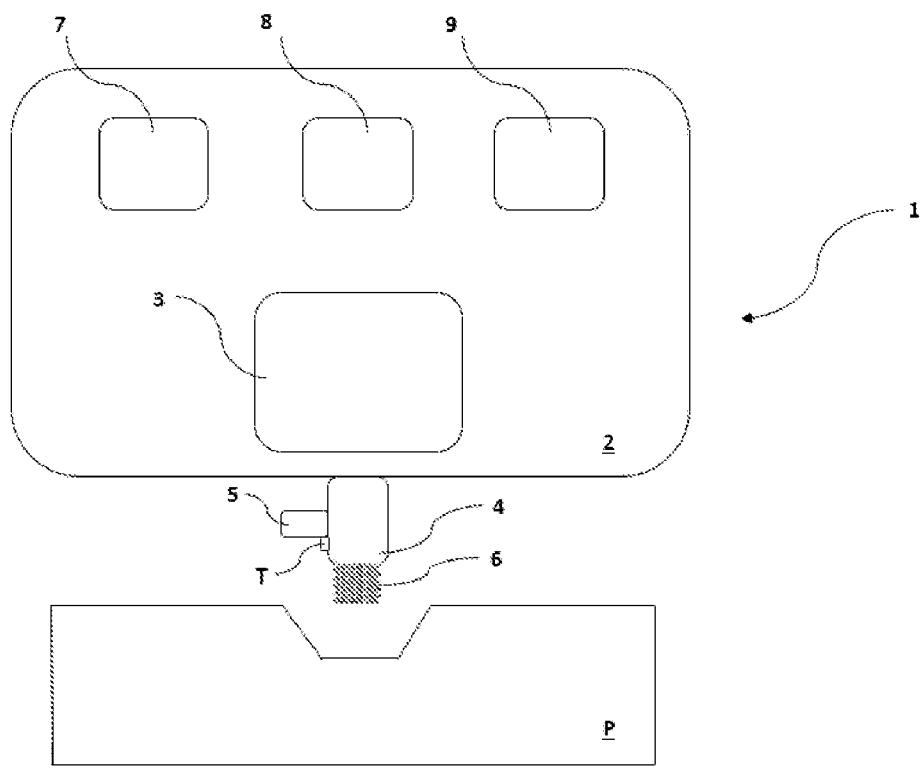

LIFE DETECTION SYSTEM FOR MACHINING TOOLS

The present invention relates to a detection system for predicting remaining service life of machining tools.

In industrial applications, machining tools are used to drill different parts. The machining tools, which move according to the part and shape certain sections on the part by drilling processes, should be made of more durable and/or rigid material than the part. However, even though the machining tools are more rigid and/or durable than the part, the machining tools wear down over time. In this case, errors may also occur in the part shaped by the machining tool.

Service life of a machining tool is predetermined by manufacturer. The machining tool is replaced after the operator uses the machining tool by a predetermined number of times. However, life of the machining tool is not only dependent on the number of uses. Life of the machining tool can vary according to different factors such as the rigidity of the part, the drilling time, the force applied on the machining tool, etc. The service life determined by the manufacturer may be more or less than the actual service life. In this case, errors may occur in the cut and/or drilled part, for example, when the machining tool completes its life before the number of uses determined by the manufacturer. If the machining tool does not complete its life when the number of uses determined by the manufacturer is reached, the operating costs may increase when the machining tool is replaced.

Japanese patent document JP2005199379, which is included in the known state of the art, discloses monitoring a tool usage condition and/or predicting a remaining service life of the tool within the near future, before the current time.

Thanks to a detection system according to the present invention, there is provided a system for detecting a remaining service life of machining tools used for drilling processes.

Another object of the present invention is to provide a detection system which enables automatic and controlled life detection process for machining tools.

A further object of the present invention is to provide a detection system which enables the remaining life of machining tools to be detected independently of human power.

Yet a further object of the present invention is to provide a simple, easy to use, practical, effective, efficient and reliable detection system.

The detection system realized to achieve the object of the invention and defined in the first claim and the other claims dependent thereon comprises at least one control unit which stores and/or controls data for drilling and/or cutting processes on different parts; and at least one machining tool which is located on the body and provides part shaping. The detection system comprises at least one image capturing device, such as a camera, which is controlled by the control unit, connected with the control unit and allows an image to be captured.

The detection system according to the invention applies also to the characteristics such as material of the drilled part and/or different cutting inserts, diameters, hole deformations etc. of the machining tool. Thus, it is able to render service to different machining tools. The image capturing device, which captures an image of the part after at least one shaping step, provides detection of errors, anomalies, deformations and/or tolerances for the machining tool by comparing and evaluating the image taken by the control unit having an artificial intelligence model and at least one reference image of the machined part which is previously added to the system by the user.

In an embodiment of the invention, the detection system comprises a control unit having an artificial intelligence model which detects the remaining service life of the cutting insert located on the machining tool and drilling a hole on the part.

In an embodiment of the invention, the detection system comprises a control unit having an artificial intelligence model which compares and evaluates the reference images previously added to the system by the user at and/or around the hole drilled on the part, and detects the remaining service life of the machining tool by detecting the deformation type and/or deformation degree. Using deep learning method, many reference images of the part are uploaded to the system, and a picture of the part is taken after the drilling process. Thanks to the deep learning method, the remaining service life of the machining tool is detected.

In an embodiment of the invention, in the detection system, the control unit having an artificial intelligence model detects the remaining service life of the machining tool by using image processing techniques. Many reference images of the part to be drilled are utilized by taking advantage of the image processing technique.

In an embodiment of the invention, thanks to a plurality of image capturing devices, the detection system provides three-dimensional scanning of the machining tool and/or the part by capturing images from a lot of angles, and uses an image processing technique with the data obtained as a result of the scanning process, so that deformation and/or tolerance are determined for wall thickness.

In an embodiment of the invention, the detection system comprises an image capturing device located on the machining tool and positioned such that it faces the drilled part. By placing an image capturing device, such as a camera, on the machining tool, the image capturing device faces the part. In this way, it is enabled that the image of the part is captured from the most suitable angle.

In an embodiment of the invention, the detection system comprises a control unit which provides at least one audible and/or visual warning about the remaining service life of the machining tool by processing the captured image in an artificial intelligence model. Thanks to the warning, the operator is informed as soon as possible for the remaining service life of the machining tool.

In an embodiment of the invention, the detection system comprises a control unit having an artificial intelligence model which allows a thermal map to be created for the drilled part after the drilling process, thanks to an image capturing device such as an infrared thermal camera that detects and visualizes a temperature of the part, wherein the artificial intelligence model compares the reference image and the thermal image. Thus, temperature of the part is enabled to be detected.

In an embodiment of the invention, the detection system enables the remaining service life of different machining tools to be detected since it can be used for a plurality of machining tools with a detachable image capturing device.

In an embodiment of the invention, the detection system comprises at least one anti-vibration apparatus which is connected with the image capturing device and at least partially prevents the vibration for the clarity of the image captured from the part. Thanks to the anti-vibration apparatus, image clarity is provided. Thus, image of the part is captured in the most appropriate way. Therefore, the control unit having the artificial intelligence model compares the captured image and at least one reference image of the machined part which is previously added to the system by the user, and enables that accuracy of the evaluation for the remaining service life test is increased.

In an embodiment of the invention, the detection system comprises a body; at least one control unit which stores and/or controls data for drilling processes. At least one machining tool located on the body and extending outward from the body is located in connection with the control unit. It comprises at least one image capturing device controlled by the control unit and connected with the control unit for capturing images.

The detection system according to the invention comprises a control unit having at least one artificial intelligence model which allows deformation and/or tolerance detection and allows the remaining service life of the machining tool to be detected by:
- capturing at least one image of the part by the image capturing device operated by means of the control unit after at least one step, wherein the part is drilled and/or cut by the machining tool;
- storing, in at least one memory unit on the body, images of the part captured by the image capturing device so that a data repository is created, and creating at least one artificial intelligence model with the deep learning applications by using the data repository created;
- processing, in the artificial intelligence model, an image of a machining tool used or a part machined by the machining tool in order to determine remaining life of the machine tool; and comparing and evaluating at least one reference image and captured image by using image processing method with deep learning applications and access to the memory unit which stores images of the part and/or the processing unit which comprises usage information for the image.

The detection system realized to achieve the object of the present invention is illustrated in the attached FIGURE, in which:

FIG. 1 is a perspective view of a Life Detection System for Machining Tools.

All the parts illustrated in figures are individually assigned a reference numeral and the corresponding terms of these numbers are listed below:
1. a Life Detection System for Machining Tools
2. Body
3. Control Unit
4. Machining Tool
5. Image Capturing Device
6. Cutting Insert
7. Memory Unit
8. Data Repository
9. Processing Unit
   (P) Part
   (U) Warning
   (T) Anti-Vibration Apparatus
   (Y) Artificial Intelligence Model
   (R) Reference Image The life detection system for machining tools (1) comprises a body (2); at least one control unit (3) which stores and/or controls data for drilling processes; at least one machining tool (4) which is located on the body (2), extends outward from the body (2), and provides part (P) shaping; at least one image capturing device (5) which is controlled by the control unit (3) and connected with the control unit (3) for capturing images (G). (FIG. 1)

The life detection system for machining tools (1) according to the invention comprises an image capturing device (5) which captures an image (G) of the part (P) after at least one shaping step; a control unit (3) having an artificial intelligence model (Y) which detects deformation and/or tolerance for the machining tool (4) and the remaining service life of the machining tool (4) by comparing and evaluating the captured image (G) and at least one reference image (R) which is previously added to the system by the user. (FIG. 1)

The life detection system for machining tools (1) comprises a body (2); at least one control unit (3) which is located in connection with the body (2) and stores and/or controls data for drilling processes; at least one machining tool (4) which is located on the body (2), extends outward from the body (2) and enables the part (P) to be cut and/or drilled; and at least one image capturing device (5) controlled by the control unit (3) and connected with the control unit (3) for capturing images.

The life detection system for machining tools (1) applies also to the characteristics such as material of the drilled part (P) and/or different cutting inserts, diameters, hole deformations etc. of the machining tool (4). Thus, it is able to render service to different machining tools. The image capturing device (5), which captures an image (G) of the part (P) after at least one shaping step, detects errors, anomalies, deformations and/or tolerances for the machining tool (4) by comparing and evaluating the image (G) taken by means of the control unit (3) having an artificial intelligence model (Y) and at least one reference image (R) of the machined part which is previously added to the system by the user.

In an embodiment of the invention, the life detection system for machining tools (1) comprises a control unit (3) having an artificial intelligence model (Y) which detects the remaining service life of at least one cutting insert (6) located on the machining tool (4) and drilling a hole on the part (P). Thanks to the cutting insert (6) located on the machining tool (4), a hole can be drilled on the part (P). Thanks to the artificial intelligence model (Y), the remaining service life of the cutting insert (6) can be detected.

In an embodiment of the invention, the life detection system for machining tools (1) comprises a control unit (3) having an artificial intelligence model (Y) which compares and evaluates the reference images (R) previously added to the system by the user at and/or around the hole drilled on the part (P), and detects the remaining service life of the machining tool (4) by detecting the deformation type and/or deformation degree. An image (G) of the part (P) is captured after drilling a hole on the part (P) by the machining tool (4). The image (G) is evaluated by the artificial intelligence model (Y) by comparing it with the reference image (R) in the system. Thus, it is enabled that the deformation type and/or deformation degree at and/or around the hole is determined.

In an embodiment of the invention, the life detection system for machining tools (1) comprises a control unit (3) having an artificial intelligence model (Y) which detects the remaining service life of the machining tool (4) by using an image processing technique. After the drilling process, an image (G) of the part (P) is captured and compared with the reference image and/or images (R) in the system, thanks to the image processing technique. Thus, detection of the remaining service life of the processing tool (4) is provided.

In an embodiment of the invention, the life detection system for machining tools (1) comprises a control unit (3) having an artificial intelligence model (Y) which provides three-dimensional scanning of the image (G) of the machining tool (4) and/or the part (P) by means of a plurality of image capturing devices (5), detects deformation and/or tolerance by using an image processing technique for part (P) thickness, and detects the remaining service life of the machining tool (4). The image (G) of the machining tool (4) and/or the part (P) drilled by the machining tool (4) is captured from more a plurality of areas by a plurality of image capturing devices (5). Thanks to the images (G) captured from a plurality of areas, it is enabled that deformation and/or tolerance is detected in the machining tool (4) by using the image processing technique in the artificial intelligence model (Y) for the thickness of the part (P) scanned in three dimensions.

In an embodiment of the invention, the life detection system for machining tools (1) comprises an image capturing device (5) located on the machining tool (4) and positioned such that it faces the drilled part (P). Thanks to the image capturing device (5) positioned almost completely facing the part (P), deformation and/or tolerance for the measurements such as hole diameter, size, error, etc, can be detected from the image (G) of the drilled part (P).

In an embodiment of the invention, the life detection system for machining tools (1) comprises a control unit (3) which provides at least one warning (U) about the remaining service life of the machining tool (4) by processing the captured image (G) in the artificial intelligence model (Y). Thanks to the warning (U) about the remaining service life of the machining tool (4), information on the remaining usage number for the machining tool (4) is provided.

In an embodiment of the invention, the life detection system for machining tools (1) comprises a control unit (3) having an artificial intelligence model (Y) which allows a thermal map to be created for the drilled part (P) after the drilling process, thanks to the image capturing device (5) that detects and visualizes a temperature of the part (P), wherein the artificial intelligence model (Y) compares the reference image (R) and the thermal image (G). After the drilling process, an image (G) of the drilled part (P) is captured and the thermal map of the part (P) is provided by the image capturing device (5) detecting the temperature. Thus, temperature-dependent deformation and/or tolerance can be determined.

In an embodiment of the invention, the life detection system for machining tools (1) comprises a control unit (3) having an artificial intelligence model (Y) which is located on the body (2) and detects the remaining service life of a plurality of machining tools (4) with the image capturing device (5) that is detachably mounted. Since the image capturing device (5) is mounted detachably, the remaining service life is determined for a plurality of machining tools (4).

In an embodiment of the invention, the life detection system for machining tools (1) comprises at least one anti-vibration apparatus (T) which is connected with the image capturing device (5) and at least partially prevents the vibration for the clarity of the image (G) captured from the part (P). Thanks to the anti-vibration apparatus (T), image (G) of the part (P) is captured so that the image (G) is clear. Thus, the image (G) accuracy is almost completely achieved.

The life detection system for machining tools (1) comprises a body (2); at least one control unit (3) which stores and/or controls data for drilling processes; at least one machining tool (4) which is located on the body (2) and extends outward from the body (2); and at least one image capturing device (5) controlled by the control unit (3) and connected with the control unit (3) for capturing images.

The life detection system for machining tools (1) comprises a control unit (3) having at least one artificial intelligence model (Y) which detects the remaining service life of the machining tool (4) by:
 capturing at least one image (G) of the part (P) by the image capturing device (5) after at least one step for drilling processes;
 storing, in at least one memory unit (7) on the body (2), images (G) of the part (P) captured by the image capturing device (5) so that a data repository (8) is created,
 comparing and evaluating at least one reference image (R) and captured image (G), which are the image and/or images of the drilled part (P), by using image processing technique with deep learning applications to the processing unit (9) that stores images (G) of the part (P);
 detecting deformation type and/or deformation degree at and/or around the hole drilled on the part (P).

The life detection system for machining tools (1) has a control unit (3) to control various steps after drilling processes. The machining tool (4) carries out the drilling processes on the part (P). The image capturing device (5) connected with the control unit (3) enables an image (G) to be captured.

The life detection system for machining tools (1) comprises a control unit (3) having at least one artificial intelligence model (Y) which allows deformation and/or tolerance detection, and allows detection of the remaining service life of the machining tool (4) by:
 capturing at least one image (G) of the part (P) by the image capturing device (5) operated by means of the control unit (3) after the part (P) is drilled, wherein the part is drilled by the machining tool (4);
 storing, in at least one memory unit (7) on the body (2), images (G) of the part (P) captured by the image capturing device (5) so that a data repository (8) is created, and creating at least one artificial intelligence model (Y) with the deep learning applications;
 processing, in the artificial intelligence model (Y), an image (G) of a machining tool (4) used or a part (P) machined by the machining tool (4) in order to determine remaining life of the machine tool (4); and
 comparing and evaluating at least one reference image (R) and captured image (G) by using image processing method with deep learning applications and access to the memory unit (7) which stores images (G) of the part (P) and/or the processing unit (9) which comprises usage information for the image (G).

The invention claimed is:

1. A life detection system comprising: a body (2); a control unit (3) which stores and/or controls data for drilling processes; a machining tool (4) which is located on the body (2), extends outward from the body (2), and provides shaping of a part; an image capturing device (5) which is located on the machining tool (4) and positioned such that it faces a drilled part (P) and captures an image of the drilled part (P) after at least one shaping step, controlled by the control unit (3), and connected with the control unit (3) wherein the image capturing device (5) is configured to detect and visualize a temperature of the drilled part (P) and provides a thermal image thereof to the control unit (3); and wherein the control unit (3) has an artificial intelligence model (Y) configured to compare and evaluate images and thermal images captured by the image capturing device (5) from at and/or around of a hole drilled on the drilled part (P) during shaping and reference images previously added by a user, and to detect a remaining service life of the machining tool (4) by detecting a deformation type and/or a deformation degree.

2. The life detection system according to claim 1, comprising at least one cutting insert (6) located on the machining tool (4), and wherein the artificial intelligence model (Y) is configured to detect a remaining service life of the at least one cutting insert (6).

3. The life detection system for machining tools (1) according to claim 1, wherein the artificial intelligence model (Y) is configured to detect the remaining service life of the machining tool (4) using an image processing technique.

4. The life detection system according to claim 1, wherein the control unit (3) provides at least one warning (U) about the remaining service life of the machining tool (4) by processing the image in the artificial intelligence model (Y).

5. The life detection system (1) according to claim 1, wherein the artificial intelligence model (Y) is configured to create a thermal map for the drilled part (P) after one of the drilling processes.

6. The life detection system according to claim 1, wherein the image capturing device (5) is detachably mounted to the machining tool (4).

7. The life detection system according to claim 1, comprising at least one anti-vibration apparatus (T) connected with the image capturing device (5) for preventing vibration and improving clarity of the image captured from the part (P).

8. An operation method for detecting the remaining service life of the machining tool (4) by at least one artificial intelligence model (Y) of the control unit (3) of the life detection system according to claim 1, the operation method comprising: capturing the image of the drilled part (P) by the image capturing device (5) after at least one step of drilling; storing, in at least one memory unit (7) on the body (2), each captured image of the drilled part (P) captured by the image capturing device (5) so that a data repository (8) is created; comparing and evaluating at least one reference image (R) of the part and the captured image of the drilled part (P) using an image processing technique with deep learning applications; and detecting the deformation type and/or the deformation degree at and/or around the hole drilled on the drilled part (P).

9. A life detection system comprising: a body (2); a control unit (3) which stores and/or controls data for drilling processes; a machining tool (4) which is located on the body (2), extends outward from the body (2), and provides shaping of a part; a plurality of image capturing devices (5) located on the machining tool (4) and positioned adjacent to a drilled part (P) for capturing images of the drilled part (P) after at least one shaping step under control of the control unit (3), each of the plurality of image capturing devices (5) coupled to the control unit (3); wherein the control unit (3) has an artificial intelligence model (Y) configured to compare and evaluate images and thermal images captured by the image capturing device (5) from at and/or around of a hole drilled on the drilled part (P) during shaping and reference images previously added by a user, and to detect a remaining service life of the machining tool (4) by detecting a deformation type and/or a deformation degree; and wherein the artificial intelligence model (Y) is configured to provide three-dimensional scanning of the drilled part (P) based on the images from the plurality of image capturing devices (5), to detect a deformation and/or a tolerance using an image processing technique for part (P) thickness, and to detect the remaining service life of the machining tool (4).

* * * * *